(No Model.)

J. W. RICHARDSON.
HORSESHOE.

No. 301,521.  Patented July 8, 1884.

Witnesses.
L. G. Powers.
Thomas S. Mathew

Inventor
James W. Richardson
Frank A. Fouts, Att'y.

UNITED STATES PATENT OFFICE.

JAMES W. RICHARDSON, OF RIVERTON, ILLINOIS.

HORSESHOE.

SPECIFICATION forming part of Letters Patent No. 301,521, dated July 8, 1884.

Application filed March 23, 1883. (No model.)

*To all whom it may concern:*

Be it known that I, JAMES W. RICHARDSON, a citizen of the United States, residing at Riverton, Sangamon county, State of Illinois, have invented a new and useful Improvement in Horseshoes, of which the following is a specification.

The object of my improvement is that the calks of any horseshoe or any similar shoe may be removed for sharpening or any other purpose at any time desired, whether upon the horse or animal at the time or not. I attain the objects by the mechanism illustrated in the accompanying drawings, in which—

Figure 1:
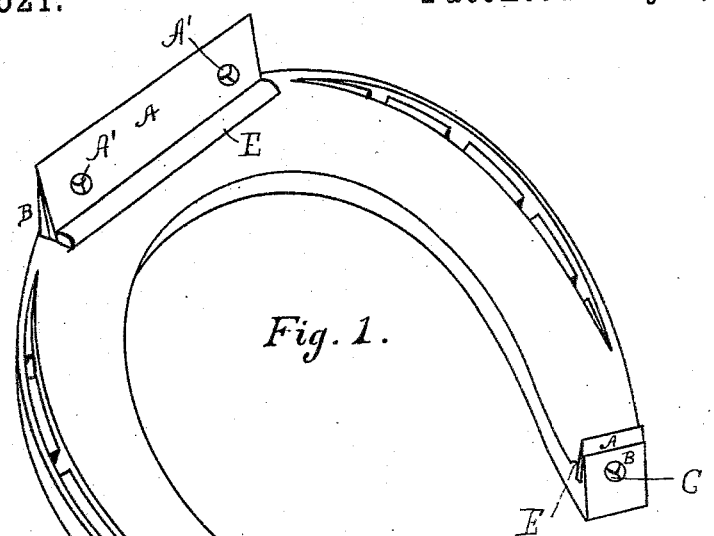
Figure 2:
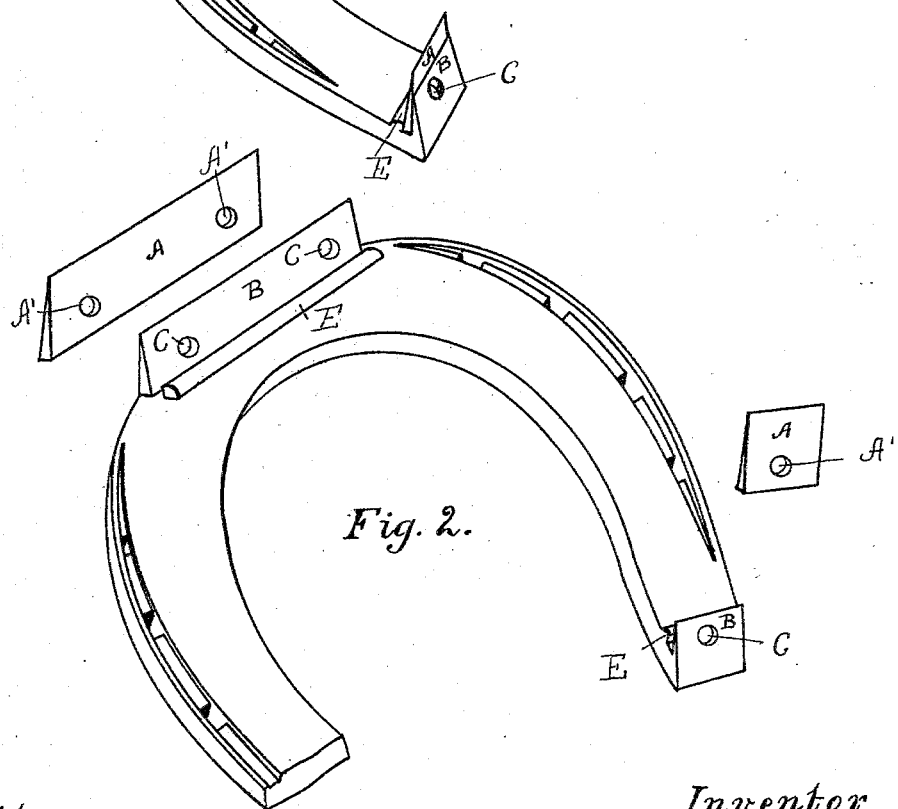

Figure 1 is a perspective showing shoe with the calk complete, where the adjustable calk is attached or fastened on. Fig. 2 is a perspective showing the adjustable calks removed.

A is a removable wedge-shaped calk provided with bolt or screw openings A'.

B is a wedge-shaped calk fixed to the under side of toe and heel of the shoe.

C represents openings in the fixed calk B.

E indicates toe and heel flanges fixed to the under side of the shoe and lying parallel with the fixed calks B.

D is a groove between the calk B and flange E for the reception of the base of the removable calk A. Said removable calk is held in place by bolts passing through the openings A' C. The removable calks extend out beyond the point of the fixed calks. Said fixed calks furnish a substantial back for the removable calks.

What I claim as my invention, and desire to secure by Letters Patent, as illustrated in the above drawings, is—

In a horseshoe, the fixed calk B, provided with openings C, and the flanges E, in combination with the removable calk A, provided with openings A', and bolts whereby the removable flange may be secured to the shoe, substantially as described, and for the purpose set forth.

JAMES W. RICHARDSON.

Witnesses:
 THOMAS WILSON,
 JOHN B. KENNEY.